July 27, 1926.
D. J. ELLIOTT ET AL
1,593,623
LIQUID SAMPLING APPARATUS
Filed Nov. 21, 1925      2 Sheets-Sheet 1
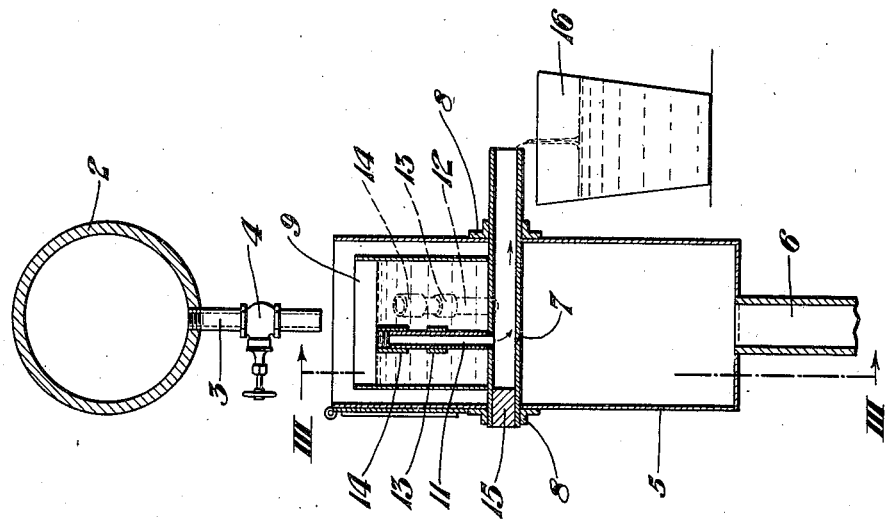
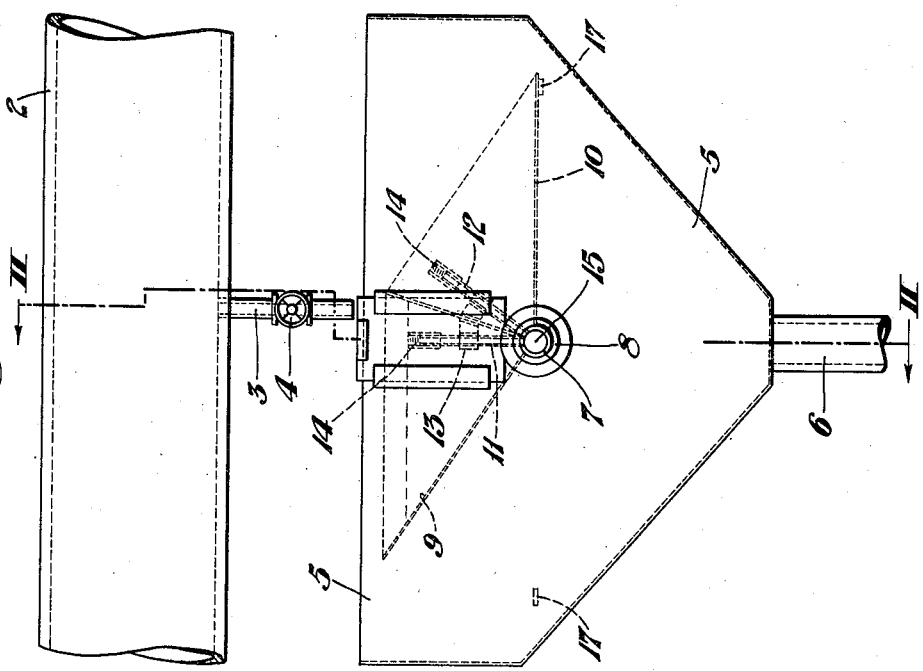
Witnesses:
Edwin Trueb
Inventors:
DONALD JOHN ELLIOTT and
GWYNNE CELLAN JONES.
by: D. Anthony Usina
their Attorney.

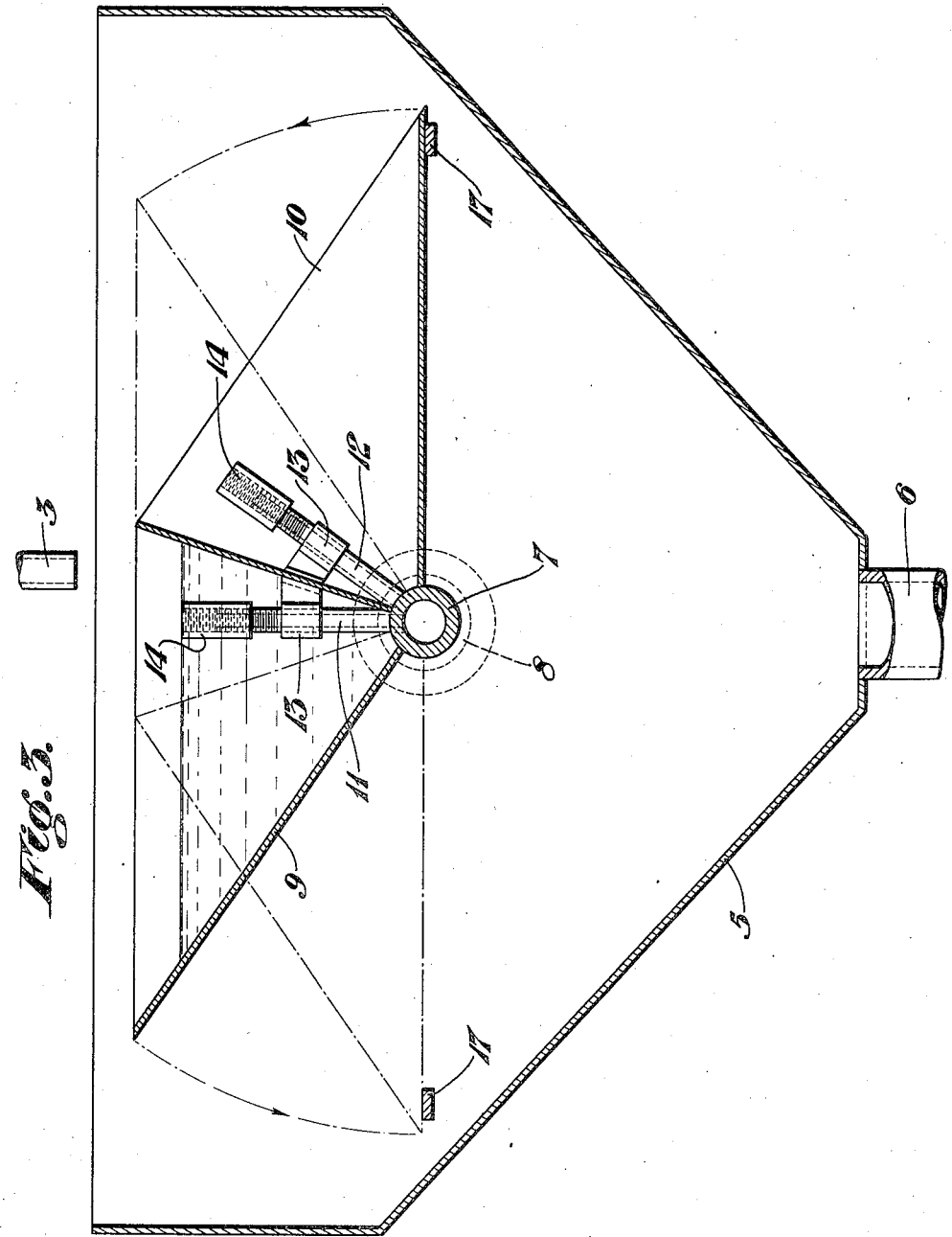

Patented July 27, 1926.

1,593,623

UNITED STATES PATENT OFFICE.

DONALD JOHN ELLIOTT, OF CLAIRTON, AND GWYNNE CELLAN JONES, OF ERIE, PENNSYLVANIA.

LIQUID-SAMPLING APPARATUS.

Application filed November 21, 1925. Serial No. 70,721.

This invention relates to liquid sampling apparatus and has for one of its objects the provision of a novel form of apparatus whereby average samples of a constantly changing body of liquid in a pipe or vessel are automatically collected.

Another object is to provide an apparatus having the novel construction, design and combination of parts hereinafter described and illustrated in the accompanying drawings.

In the drawings—

Figure 1 is a side elevation showing our apparatus connected with a liquid conveying conduit.

Figure 2 is a sectional elevation on the line II—II of Figure 1.

Figure 3 is a sectional elevation on the line III—III of Figure 2.

Referring more particularly to the drawings, the numeral 2 designates a pipe line for conveying light oils from a still to a suitable tank.

A sample outlet pipe 3 is tapped into the pipe 2 and is provided with a valve 4 for controlling the flow therethrough.

A main stationary receiving tank 5 is positioned below the pipe 3 and is provided with an outlet or drain pipe 6 at its lower end.

A hollow shaft 7 is journaled in bearings 8 in the tank 5 and a pair of sampling receptacles 9 and 10 are secured to the shaft 7. The receptacles project a considerable distance beyond the shaft so that when a predetermined amount of liquid is collected in either one of the receptacles it will be overbalanced and cause the shaft to rotate about its axis thus moving the filled receptacle into discharging position and moving the other receptacle into filling position.

The receptacles 9 and 10 are provided with overflow sampling tubes 11 and 12, respectively, which are tapped into the hollow shaft 7 and supported by brackets 13. The tubes 11 and 12 are each provided at their upper ends with threaded sleeves 14 which may be screwed up or down to regulate the quantity of sample overflow.

The rear end of the shaft 7 is closed by a plug 15 while the forward end is open to permit the liquid overflowing through the tubes 11 and 12 to flow out into a sample container 16.

A pair of stop bars 17 are mounted in the tank 5 so as to be engaged by the overbalanced receptacles 9 and 10, and thereby stop their movement when the other receptacle is in receiving position.

In operation the valve 4 will be adjusted so as to permit a small flow from the pipe 2 through the pipe 3. Either one of the receptacles 9 or 10 will be positioned to receive the flow of liquid from the pipe 3 and will retain the liquid until a quantity has flowed through the overflow tube at which time the weight of the liquid will overbalance the filled receptacle causing the shaft 7 to rotate in its bearings 8 and move the receptacle downwardly so as to dump or discharge the liquid into the tank 5. Simultaneously with the movement of the filled receptacle into discharging position the other empty receptacle will be moved into receiving position to receive the liquid from the pipe 3 since both receptacles are secured to the same shaft. The second receptacle will then fill and a part of the liquid therein will discharge through its overflow tube prior to the receptacle being overbalanced to discharge its liquid and move the first receptacle back into receiving position. The receptacles 9 and 10 will thus alternately be moved into receiving and discharging position continuously as long as the valve 4 remains open.

The liquid samples overflowing through the tubes 11 and 12 will flow into the hollow shaft 7 and then into the sample container 16.

By the use of the mechanism above described average samples are obtained. That is, the liquid overflowing through the tubes 11 and 12 will be an average or mixture of what is collected over a period of time in the receptacles 9 and 10 and this average sample fluid is further mixed in the container 16 so that the liquid in the container 16 is truly a representative sample of the fluid in the tank supplied by the pipe 2.

It will be readily seen that in order to collect such an average sample directly from the pipe 2 without the use of the above described mechanism a great quantity of the liquid would have to be collected, which would require large storage tanks and rehandling apparatus.

While we have shown and described only one specific embodiment of our invention it will be understood that we do not wish to

We claim:

1. The combination with a liquid container having an outlet, of a liquid sampling mechanism adapted to receive liquid from said outlet, said mechanism comprising a main stationary receiver, a hollow shaft journaled in said main receiver, a pair of sampling receptacles mounted on said shaft to receive the liquid from said outlet, said receptacles projecting beyond the opposite sides of said shaft respectively so that when a predetermined amount of liquid is collected in either of said receptacles said receptacle will be overbalanced and rock said shaft, thereby moving out of the path of the liquid from said outlet and moving the other of said receptacles into position to receive the liquid, said overbalanced receptacle discharging the liquid contained therein into said main receiver, and an overflow pipe comprising relatively adjustable telescoping sections and located in each of said sampling receptacles, said pipes opening into said hollow shaft and adapted to permit a predetermined amount of liquid to flow from said sampling receptacles into a suitable container just prior to the overbalancing of said receptacles.

2. The combination with a liquid container having an outlet, of a liquid sampling mechanism adapted to receive liquid from said outlet, said mechanism comprising a main stationary receiver, a hollow shaft journaled in said main receiver, a pair of sampling receptacles mounted on said shaft to receive the liquid from said outlet, said receptacles projecting beyond the opposite sides of said shaft respectively, so that when a predetermined amount of liquid is collected in either of said receptacles said receptacle will be overbalanced and rock said shaft, thereby moving out of the path of the liquid from said outlet and moving the other of said receptacles into position to receive the liquid, said overbalanced receptacle discharging the liquid contained therein into said main receiver, and an overflow pipe comprising relatively adjustable telescoping sections and located in each of said sampling receptacles adapted to permit the overflow of a small sample of liquid from said sampling receptacles just prior to the overbalancing of said receptacles, and means for receiving the overflow samples from said overflow pipe.

In testimony whereof, I have hereunto set my hand.

DONALD JOHN ELLIOTT.

In testimony whereof, I have hereunto set my hand.

GWYNNE CELLAN JONES.